April 27, 1965  J. ADAMSKI  3,180,675
CONVERTIBLE TOP MECHANISM
Filed April 10, 1963  10 Sheets-Sheet 1

INVENTOR.
Joseph Adamski
BY
Dale A. Winnie
ATTORNEY

INVENTOR.
Joseph Adamski
BY
Dale A. Winnie
ATTORNEY

April 27, 1965 J. ADAMSKI 3,180,675
CONVERTIBLE TOP MECHANISM
Filed April 10, 1963 10 Sheets-Sheet 4

INVENTOR.
Joseph Adamski
BY
Dale A. Winnie
ATTORNEY

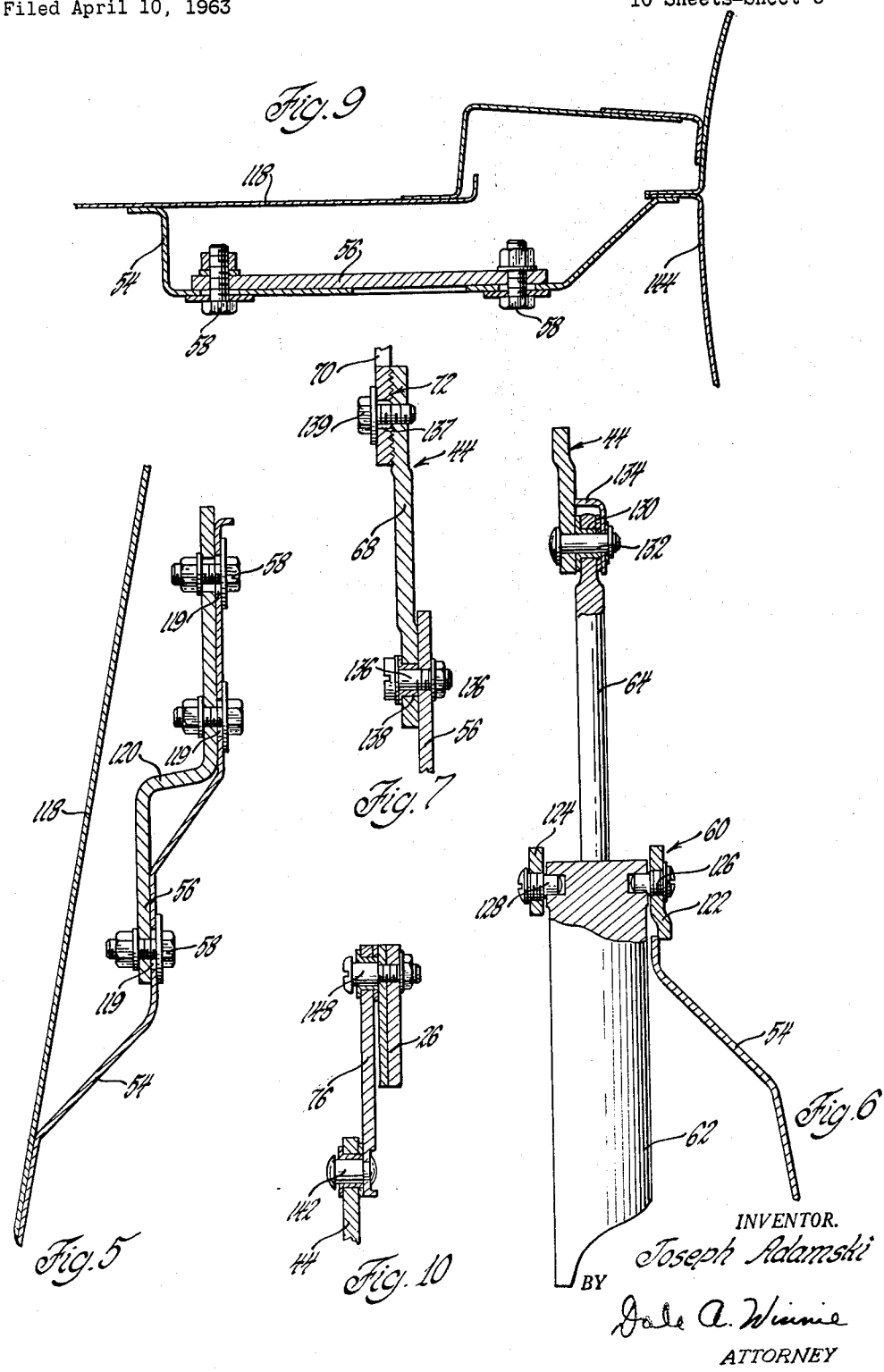

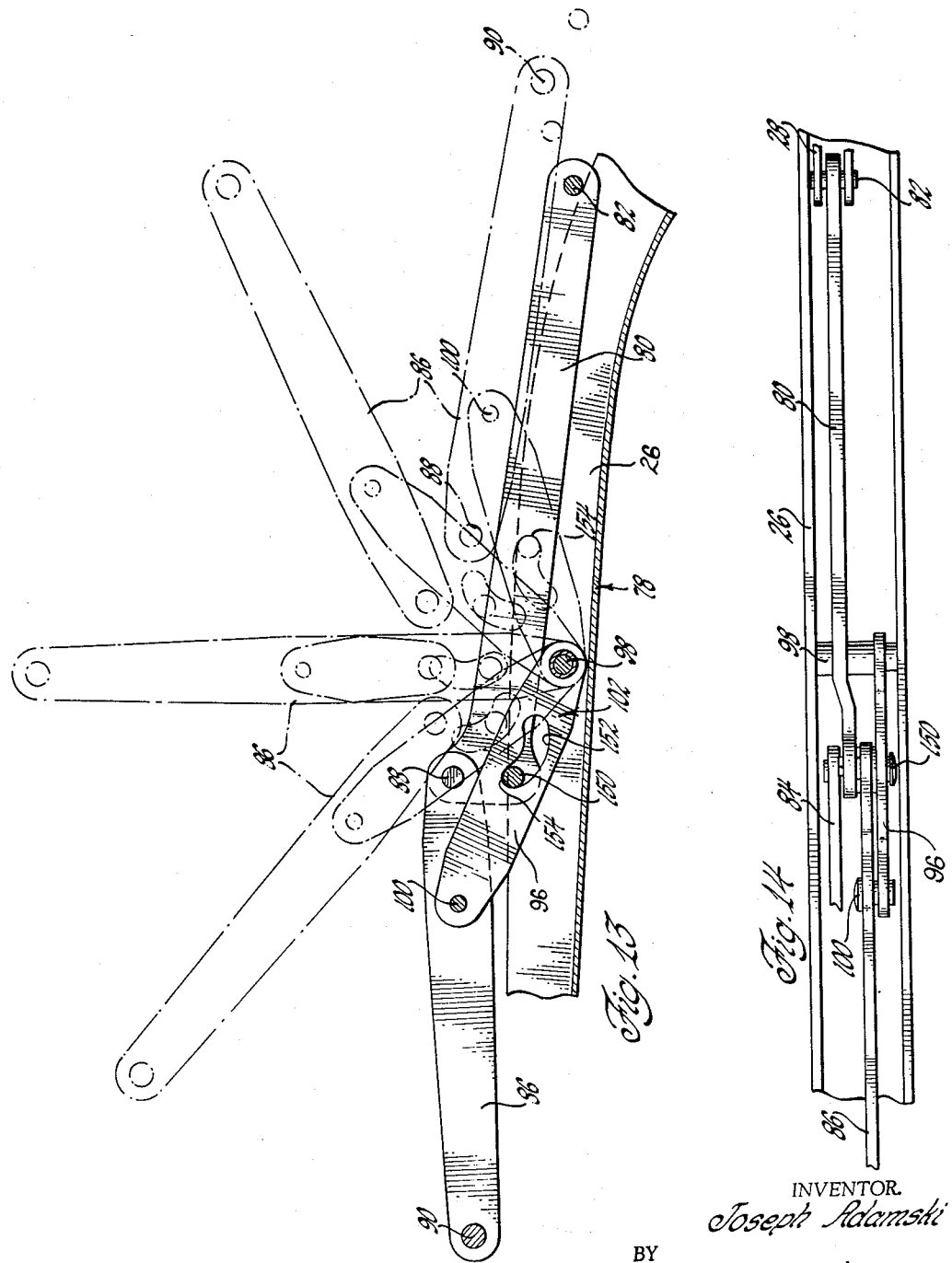

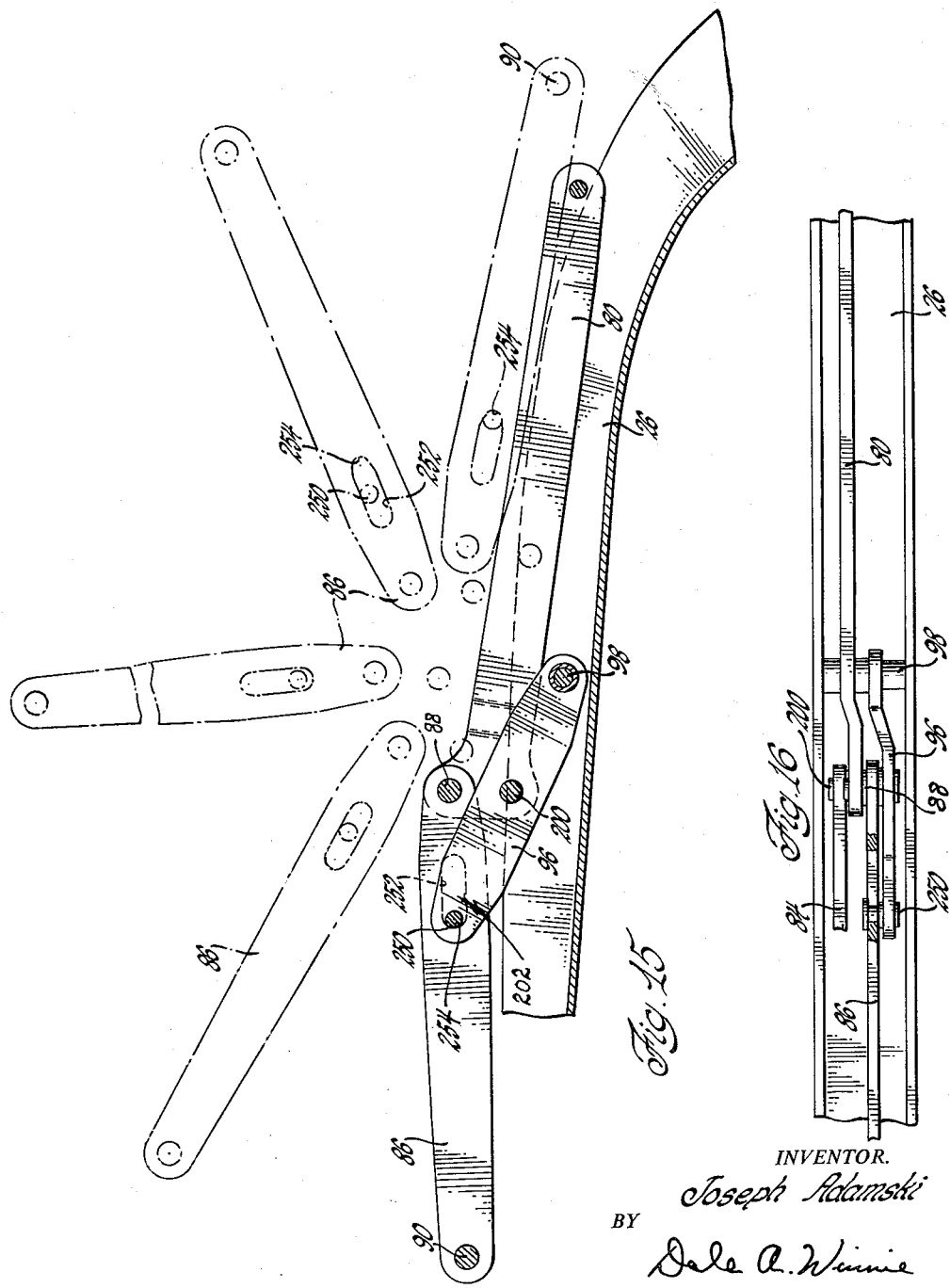

April 27, 1965 J. ADAMSKI 3,180,675
CONVERTIBLE TOP MECHANISM
Filed April 10, 1963 10 Sheets-Sheet 9
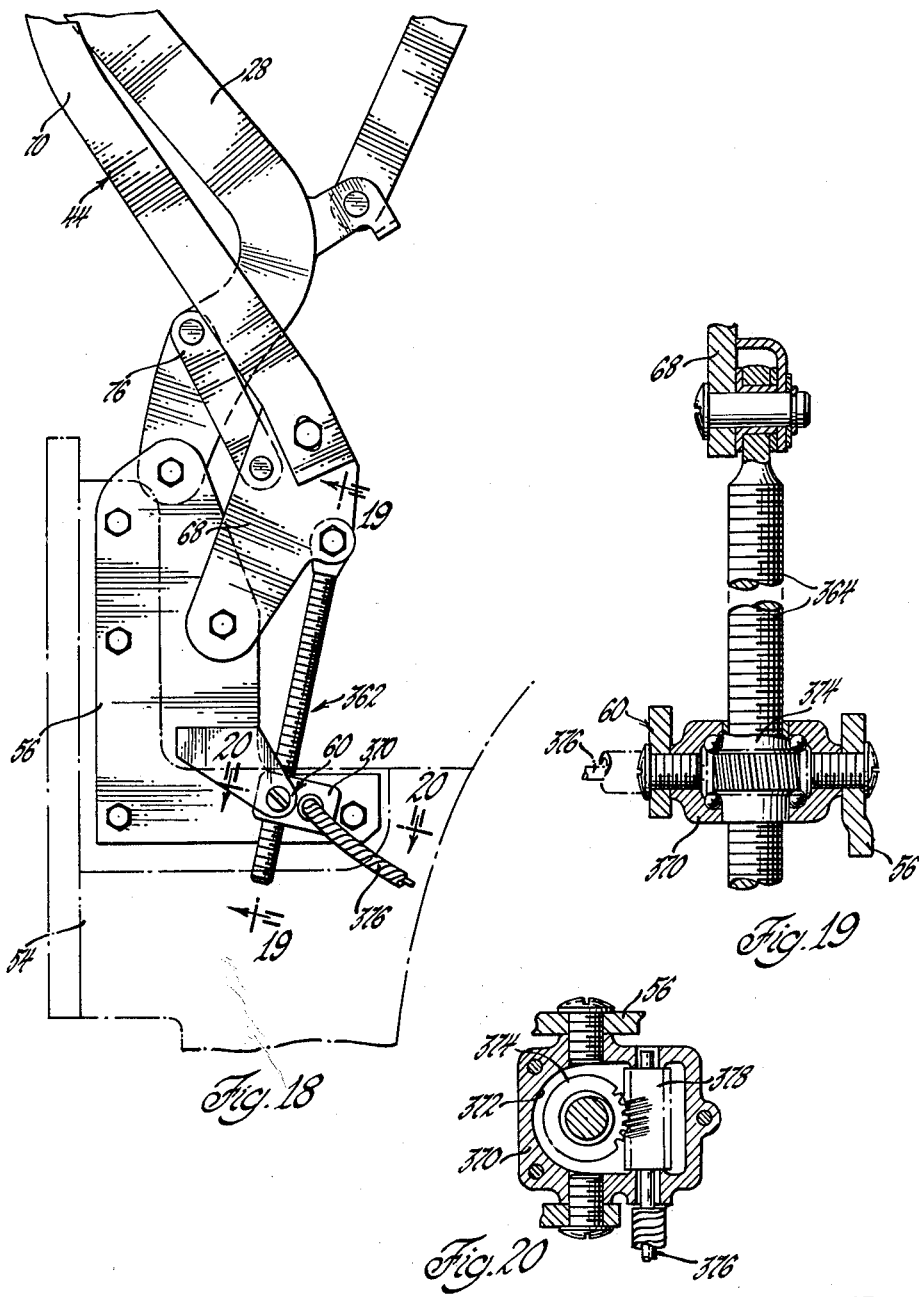
INVENTOR.
Joseph Adamski
BY
ATTORNEY

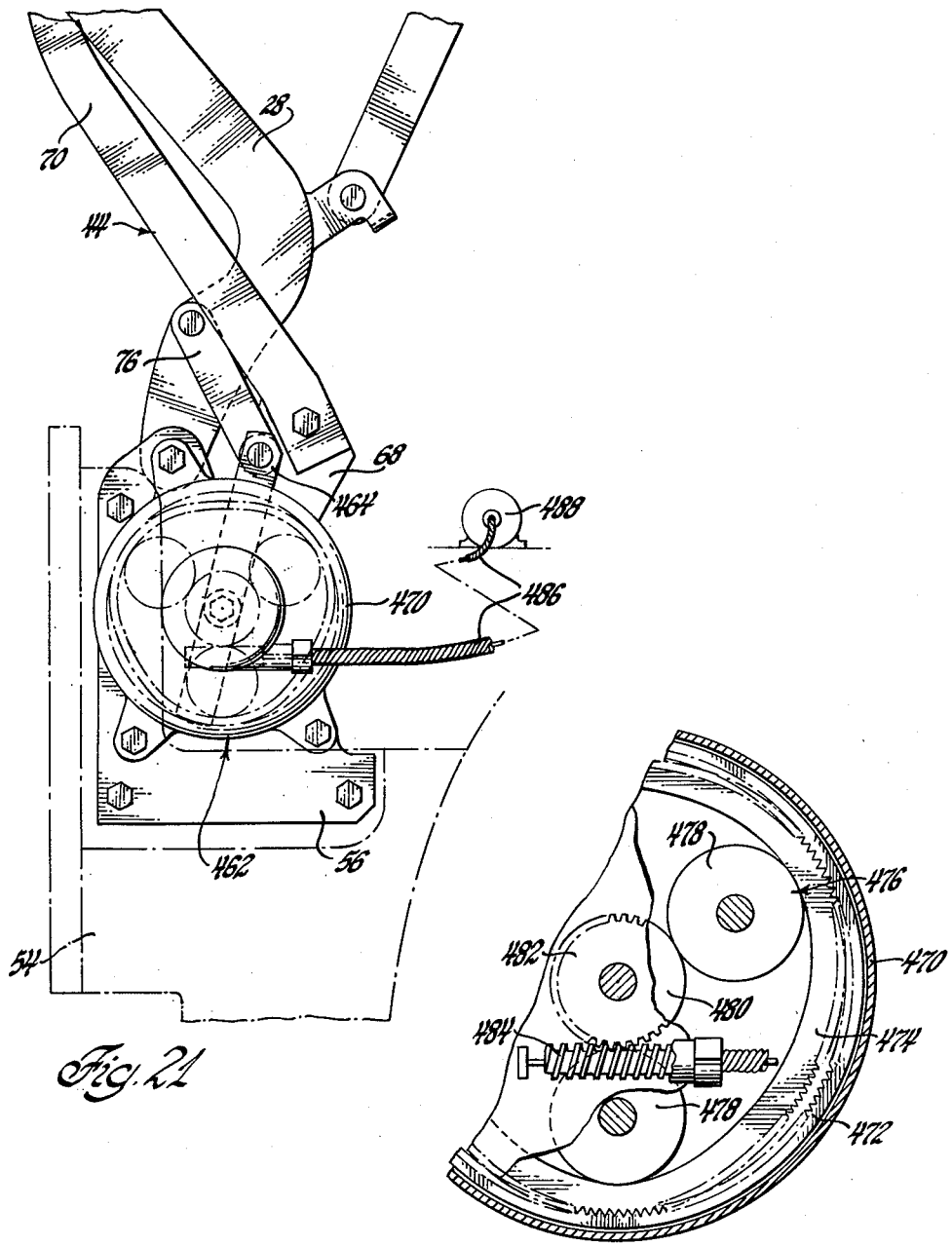

United States Patent Office 3,180,675
Patented Apr. 27, 1965

3,180,675
CONVERTIBLE TOP MECHANISM
Joseph Adamski, Manitou Beach, Mich., assignor to Dura Corporation, Oak Park, Mich., a corporation of Michigan
Filed Apr. 10, 1963, Ser. No. 271,960
11 Claims. (Cl. 296—117)

This invention relates to folding tops for convertible type automotive vehicles and more particularly to the operative mechanism for such folding tops and the means of applying power to and through the operating mechanism for more efficient operation of such folding tops.

Most folding tops for convertible type automotive vehicles includes a fabric covered framework formed by articulated side rails, interconnecting cross-bows and a suitable operating linkage for raising and lowering the top between an erected position over the vehicle body and a retracted position within a storage compartment space within the vehicle body. The tops are usually operated by a pair of operatively interconnected hydraulic cylinders or like operative means provided in the vehicle body on opposite sides thereof and connected to the rear side rails of the folding top structure.

In the use of hydraulic cylinders it has been common to have the lower ends of the cylinders pivotally anchored to the vehicle floor or frame and to have the extended ends of the piston rods pivotally connected to the lower portion of the rear side frame rails of the top structure in spaced relation to the pivotal connection thereof to the vehicle body in order to obtain a rotation inducing force moment about the pivotal axis of the top operating rear side frame rails. Unfortunately, in this arrangement the point of force application moves radially about the pivotal axis of the rear side rails and a considerable stroke is required by the linear force applicator to obtain the full degree of rotation necessary. Furthermore, the resultant force moments are least at the extreme positions of arcuate travel, where the greatest force moments are most needed, due to the closer proximity of the applied force to the pivotal axis of the member being actuated.

Considerable improvement is obtained in the trunnion mounting of the linear force applicator by pivotal means at the upper end thereof, rather than on the vehicle frame or floor, as provided by my patent application Serial No. 183,129 entitled Top Operator With Trunnion Mounted Cylinders and filed March 28, 1962 in the U.S. Patent Office. However, further improvements are foreseeable and are herein set forth.

In having the actuating force connected directly to the rear side frame rails, as mentioned, and because of the long stroke required, design layout procedures have in turn caused the upper part of the linear force applicators to be placed as close to the rear side frame rails as possible and upward in the vehicle body where the actuator is visible and detracts from the clean and uncluttered interior styling of the vehicle. It has also required the balance link of the operative mechanism to be displaced inwardly with a consequent reduction in the width of the seating space otherwise available.

Having the actuator attached directly and solely to the rear side frame rails, as has been the practice, also introduces the further disadvantage of having the entire force which is delivered to the top applied through this lone component and makes it the sole primary source of radial force affecting movement and through which force must be transmitted to other parts of the operative mechanism. This obviously requires heavier and more massive frame rails and operative links than would otherwise be necessary.

The balance link besides being displaced inwardly, must serve as a drag link for the forward part of the structure through its upper pivotal connection with the intermediate top frame rail. This creates and introduces tension in the rest of the operative mechanism and other top operating components which is contrary to the compression load applied by the actuator through the rear frame rails.

In the further use of the applied power to actuate the forward part of the folding top, the operative mechanism usually also has included certain links disposed in an upstanding position over the side rails in order to obtain sufficient leverage forces for the work required. In an effort to obtain lower and slimmer roof styling, and to otherwise improve internal and external appearances, attempts have been made to lower and inwardly offset the linkage centers of these components with respect to the folding top frame rails. However, this has caused a loss of force moments and control over the forward side frame rails of the top structure; particularly in setting the heavy forward cross-bow component of the top on the windshield header bar. It has also introduced excessive stress and strain into these components, as for example in the break-out action of the top in being lifted and retracted off from the windshield header bar, or out of storage, and has required the use of heavier and more massive components than are otherwise necessary.

Aside from this loss of control over the operative linkage in the actuation of the folding top, the force required to affect this knuckling or break-out action has been considerable and is known to usually make audible power demands on the power source. The same situation exists in pulling down the top framework into the storage space when the top is fully retracted as well as in lifting the top out of the storage space. Sufficient power and proper application of the power available is essential to obtain low stacking of the framework, to accommodate folds of the top fabric and to avoid unflattering and undesirable styling of the vehicle otherwise necessary to compensate therefor.

The inwardly offset disposition of the operating links with respect to the side rails has a still further disadvantage in introducing a side thrust and side buckling tendency into the side rails and upper operative linkage when the top operating forces are applied. This creates a binding in the pivotal connections, and a consequent increase in the power requirements which further propounds the disadvantages last mentioned. It also necessitates the heavier linkage components and an increase in the overall weight and cost of the vehicle top assembly.

Certain of these adverse effects are minimized by the use of a slot in the top portion of the primary rocker link or upper operative mechanism for the top framework, as shown in my previously mentioned patent application and in U.S. Letters Patent 3,036,859 titled Convertible Top and issued May 29, 1962. However, the compensation provided by this arrangement does not fully meet the demands of the top operating system and certain improvements thereover are set forth herein.

As will subsequently be shown and described, use of a cam slot, in place of a lost motion slot, and one disposed elsewhere in the operative linkage, enables obtaining more suitable biasing forces for holding the top erected or in a low stacking position. It also provides a linkage where these forces are more easily relieved without excessive power demands and it assures an operative mechanism providing continuous control of the top at and between its extreme positions.

In reducing the power demands upon the power system it also becomes possible to effect savings in the power actuator. With less power required a smaller hydraulic cylinder with less fluid and a consequently smaller reservoir system becomes possible and more flexibility of design layout follows. This in turn reduces the necessary length of the cylinder and the power stroke with still further savings.

Aside from the savings effected in the reduction of the power demands, a decided advantage is obtained with regard to the placement of the power source in that a smaller and more compact power source may be more propitiously disposed and even further advantages may be obtained in such relocation.

As will be appreciated in the embodiment of this invention hereinafter shown and described, a hydraulic cylinder or other form of force applicator may hereafter be attached to a common support along with the rear frame side rail and balance link of a folding top structure. Further, the fixed position of the balance link and rear frame side rails relative to each other on a common support makes possible the use of a connecting or force transfer link therebetween. The power actuator may accordingly be disposed on the common support under the balance link and the top actuating force may be transmitted simultaneously and cooperatively through both the balance link and the rear frame side rails, rather than either one singularly, to effect radial movement and the transmission of power therethrough to other components without any adverse drag link effect as was previously present.

The mounting of the power actuator and receptive components of the folding top on a common support enable preassembly and adjustment of the pivotal centers of these and other components of the folding top. This provides a complete folding top assembly which may be installed in a vehicle body and will require practically no installation adjustments.

In the transfer of power radially through the balance link and the rear frame side rail, jointly, a further efficiency and reduction in the size and weight of the different components is obtained.

The operative power transmitted through the rear frame side rails and balance link is advantageously applied to the linkage controlling the operative mechanism of the forward part of the folding top structure and to the cam slot control therein to obtain continuous control in erecting and retracting the top as well as in stabilizing the top in both its erected and retracted dispositions.

It will be appreciated that while the several features mentioned may be cooperatively disposed and provided within an operating structure, such as in the case hereinafter shown and described, that these features have significance independent of each other and in sub-combinations thereof.

It is an object of this invention to provide a folding top structure for convertible top automotive vehicles which is relatively simple in construction, easy to assemble and may be installed as a pre-adjusted subassembly in a vehicle body.

It is an object of this invention to provide a folding top structure requiring less massive side rails and operating components than have previously been used and one which makes use of a more compact power actuator than has previously been adaptable for use therewith.

Another object of this invention is to provide a folding top structure including actuator means and operative mechanism which may be more compactly arranged and disposed within a vehicle body to permit improvements in interior and exterior styling and greatest seating capacity within the vehicle.

A still further object of this invention is to provide a folding top operating mechanism suitable for use with different types of power actuators with assurance of continuous and coordinated control thereover in the actuation thereof and for static rigidity thereover in erected and retracted dispositions thereof.

It is an object of this invention to provide an operative mechanism for a folding top structure having internal tensioning forces continuously applied to assure motive and static rigidity in the operation and terminal dispositions thereof.

It is an object of this invention to provide an improvement in the operative mechanism for a folding vehicle top including cam operative means for constant control and variable application in the operation of a top without excessive power demands.

The objects of this invention in more specific detail, and as pertains to the embodiment hereinafter described, includes providing a folding top operating mechanism using a short stroke trunnion mounted actuating cylinder having the rod end thereof attached to a structurally rigid balance link which is interconnected with a rear frame side rail for the transfer of operative forces through both thereof via a force transfer link. The top operating mechanism includes a power receptive operational linkage including the force transfer link and having the force applicator connected thereto. The operative mechanism also includes an operational linkage receptive of the force transmitted through the other part thereof and inclusive of the cam slotted link components for obtaining constant control and rigidity in the extension and retraction of the forward part of the top structure.

Suffice it to say that these and other objects and advantages will be more fully appreciated and better understood upon a reading of the following specification in regard to a preferred embodiment of the invention and with particular reference to the accompanying drawings.

Figure 4:
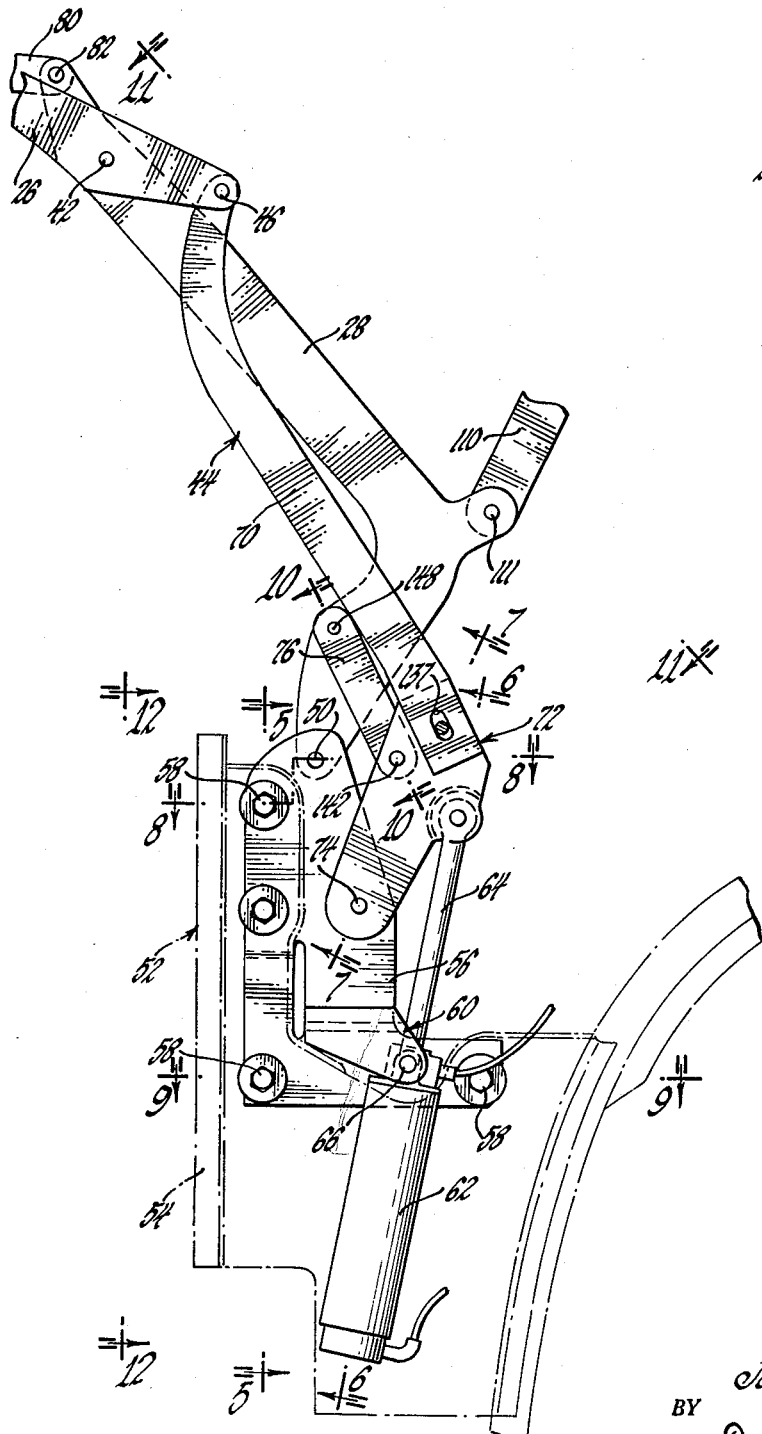
FIGURE 4 is an enlarged and fragmentary side view of the power operated portion of the vehicle top operating mechanism.

FIGURES 5–10 inclusive, are cross-sectional views on an enlarged scale taken as indicated by the corresponding section lines on FIGURE 4.

Figure 11:
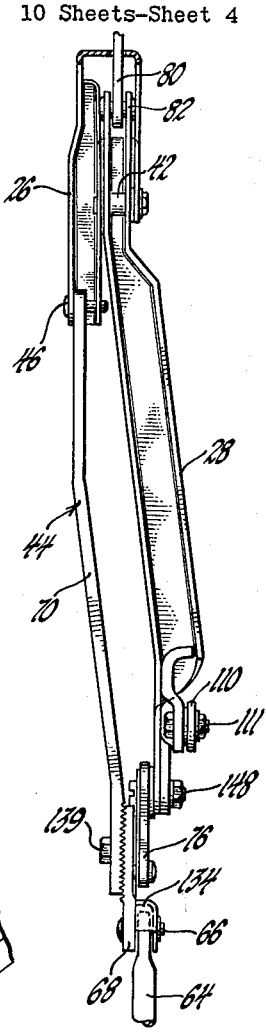

FIGURES 11 and 12 are top and end views respectively of the operating mechanism shown by FIGURE 4 and as seen in the plane of the corresponding section lines and looking in the direction of the arrows thereon.

FIGURE 13 is an enlarged detail and progressive illustration of a part of the operating mechanism as seen in different sequential positions assumed thereby.

FIGURE 14 is a top plan view of the frame rail structure and rocker arm detail shown by FIGURE 13 with the operative components in the top erected position.

FIGURES 15 and 16 are similar to FIGURES 13 and 14, respectively, and show a modification therein.

Figure 17:
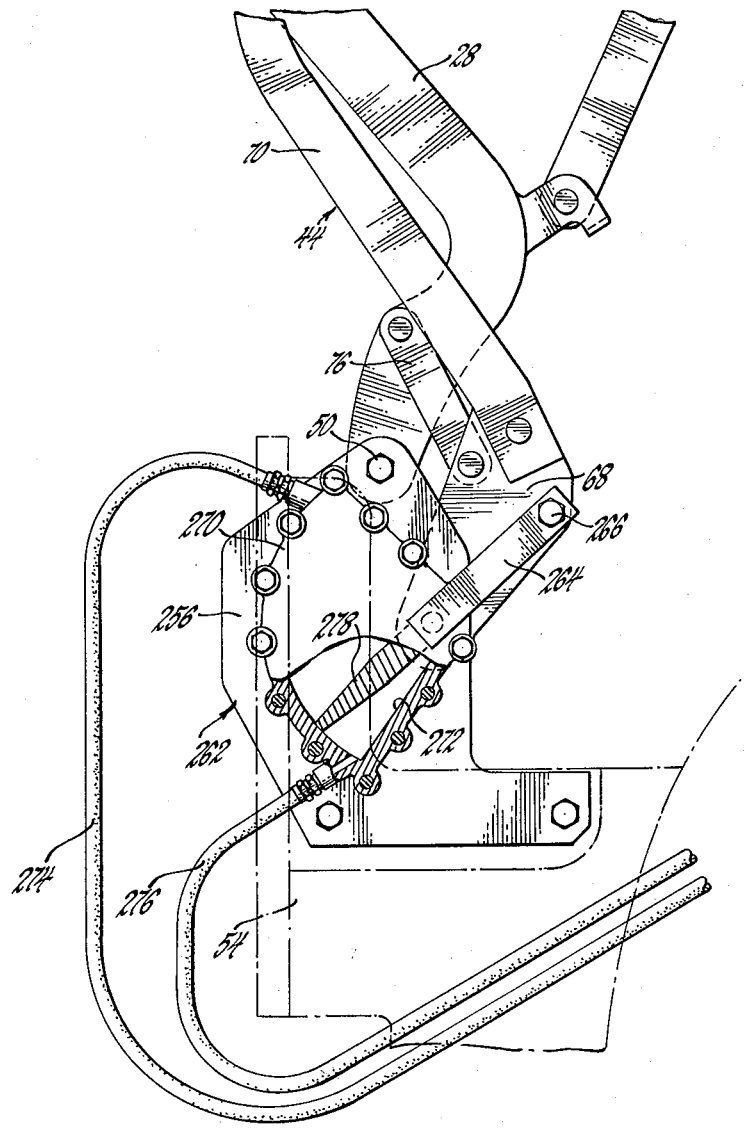

FIGURE 17 is an enlarged side view of part of the top operating mechanism showing a different type of power actuator.

FIGURE 18 is an enlarged side view of a different type of power actuator, while FIGURES 19 and 20 are enlarged cross-sectional details thereof as seen on corresponding section lines.

FIGURE 21 is an enlarged side view of still another type of power actuator, and FIGURE 22 is an enlarged fragmentary section thereof.

Figure 1:
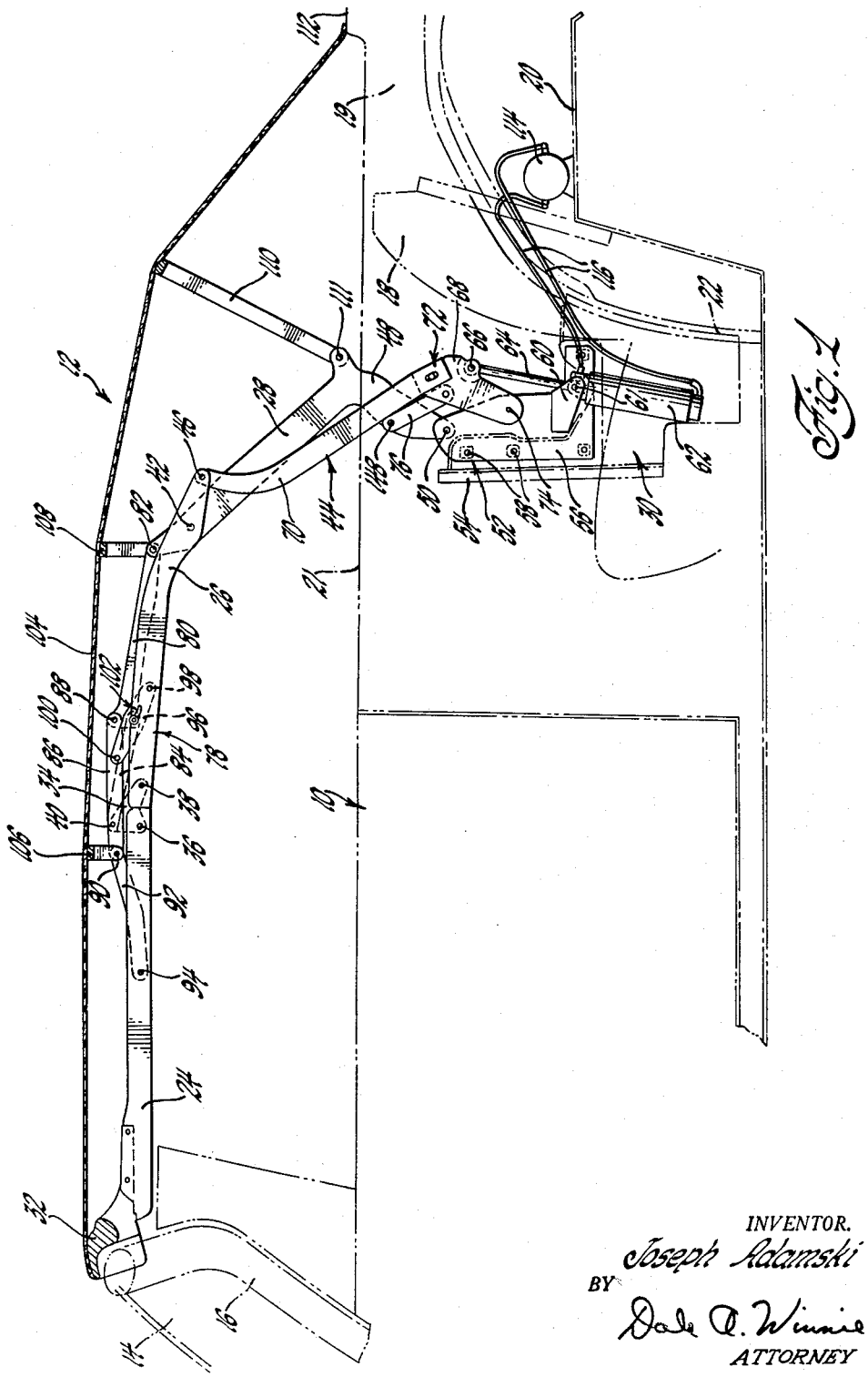
FIGURE 1 is a vertical section through a convertible top shown in the erected or extended position and with certain parts of the vehicle body shown in phantom. It is to be appreciated that the near side of the top operating linkage is shown and that such linkage is duplicated on the far side of the vehicle.

Referring to the drawings in further detail, and FIGURE 1 in particular, a vehicle body 10 is shown in phantom outline and as provided with a folding top 12 which is shown as erected and extended thereover.

The vehicle body 10 is shown sufficiently to identify the windshield 14 having a header bar 16 and a rear seat 18 behind which is provided the trunk area and space 19 receptive of the folding top 12 in its fully retracted and stored position. The rear axle hump 20, vehicle belt line 21 and rear wheel housing 22 are also shown and identified for general reference purpose.

In the subsequent discussion of the folding top 12 and the operative mechanism thereof, reference made to the "forward" or "rearward" disposition of any member, or the use of like terms, is to be understood as with regard to the position thereof when the top is erected. This may also be likened to the front or back ends of the vehicle 10 on which the top is provided.

The top structure 12 includes articulated side frame rails and interconnecting cross-bows which form a framework over which a fabric cover is extended. The side frame rails are each made up of a front side frame rail section 24, a center side frame rail section 26 and a rear side frame rail section 28. The articulated side frame rails are symmetrically opposite and are power operated by actuating means 30 connected to the rear side frame rail sections 28 and provided on opposite sides of the vehicle body 10.

As will be appreciated, the actuating means 30 are interconnected for synchronous operation and are mounted on the vehicle body and obscured within suitable housings provided in the rear passenger compartment area.

The front side rail sections 24 have a top header 32 provided across their forward ends and formed for engagement with the windshield header bar 16. A pivot plate member 34 is connected to the rear end of the front side rail section 24 and to the forward end of the center rail section 26. The pivot plate is triangular in shape with spaced pivot connections 36 and 38 for engagement with the front and center side rail sections 24 and 26 respectively and with a third pivotal connection 40 disposed apart therefrom for connection to an operating link in a manner later described.

The center side rail section 26 is connected to the pivot plate 34, as mentioned, and includes a pivotal connection 42 near its rear end providing engagement with the rear side rail section 28. An operative or balance link 44 is engaged to the rearmost end of the center side rail section 26 by means of the pivotal connection 46.

The rear side rail section 28 is pivotally connected to the center rail section 26 at 42, as mentioned, and is formed to provide a transversely disposed or right angle end 48 which is pivotally connected at 50 to a support structure 52.

The support structure 52 includes a panel 54 which is part of the vehicle body weldment and a support plate 56 which is adjustably secured to the panel 54 by means of fasteners 58. The support plate 56 is offset inwardly at its lower end and includes an outwardly offset side extension 60 forming a yoke and trunnion pivot support 61 for the hydraulic cylinder 62 which serves as the power actuator.

The power cylinder 62 may be much smaller than previous cylinders used for like purposes since the disclosed top makes better use of the power applied thereto. Further advantages are obtained in mounting the smaller cylinder on the support means 52 and having it trunnion supported at its upper end. Aside from enabling the cylinder to be positioned for a shorter and more productive work stroke, this avoids the floor or frame connection and makes the actuator part of the top assembly. This, in turn, enables pre-adjustment of the complete top assembly and subsequent installation on a unit in a vehicle body.

The piston rod 64 of cylinder 62 is pivotally connected to the balance link 44 as at 66.

The balance link 44 is shaped somewhat like the rear frame side rail section 28 with a lower angular part 68 and an extended upper part 70. The two parts of the balance link are separate and relatively adjustable by means of a serrated connection 72 therebetween. However, they form an essentially rigid component when so engaged and locked together.

The lower end of the balance link 44 is pivotally connected to the support plate 56, as at 74, in spaced relation to the connection of the rear frame side rail section 28 thereto.

Actuation of the folding top 12 is initiated by the application of power through the operative linkage including the balance link 44, the rear frame rail section 28 and the transfer link 76. The folding top is further controlled in its movement by the operative linkage 78 which includes a power or thrust link 80 pivotally connected at 82 to the upper end of the rear frame rail section 28. The thrust link 80 includes an extension link 84 which is pivotally engaged to the forward end thereof and in turn to the pivot plate 34 which, as previously indicated, provides for hinging action between the forward and center frame rail sections 24 and 26.

The operating linkage 78 also includes a primary rocker link 96 which has one end pivotally connected at 98 to the center side rail section 26 and the other end pivotally connected at 100 to a secondary rocker link 86 and intermediate the ends of the latter. The primary rocker link 96 includes a cam slot connection 102 with the thrust link 80 and has the after end of the secondary rocker link connected to the latter at 88. The forward end of the secondary rocker link 86 has its other end pivotally connected at 90 to a front rail control link 92. The latter is in turn pivotally connected at 94 to the forward frame rail section 24 at an intermediate location between the ends thereof.

The folding top 12 includes a fabric material covering 104 which is secured to the top header 32 and extends rearwardly over supporting cross-bows. A forward cross-bow 106 is provided at the pivotal junction 90 between the operating link 86 and the front rail control link 92. A center cross-bow 108 is provided at the pivotal junction of the rear side rail section 28 and the thrust link 80. A rear cross-bow 110 is pivotally connected at 111 to the rear side rail section 28. The fabric top is finally anchored at the rear deck end 112.

As will be appreciated, the fabric top material 104 is secured to the spaced cross-bows 106, 108 and 110 such that the cross-bows are erected when the folding top 12 is fully extended and the fabric is pulled taut. Likewise, it will be understood that when the convertible top 10 is retracted for storage the cross-bows are folded down horizontally and the top fabric 104 is folded therebetween.

The power cylinders 62 are activated by control means in the passenger compartment which are not specifically shown. Such control means place in operation a fluid pump and motor 114 operatively connected by fluid lines 116 to the power cylinder 62. The fluid cylinder 62 is of the double-acting type permitting the piston rod 64 to be controlled for either extension or retraction of the folding top.

Referring now to particular parts of the folding top operating framework in greater detail:

FIGURE 5 shows the support panel 54 secured to the inner side wall 118 of the vehicle body 10. It also shows the mounting bracket plate 56 as secured to the support panel 54 by the nut and bolt fasteners 58. The mounting bracket 54 is provided with enlarged openings 119 through which the fasteners 58 are extended and whereby adjustment of the support plate is permissive.

In passing, it will be noted that the plate 56 is offset at 120 to dispose the lower edge thereof closer to the inner body side wall 118. It will subsequently be appreciated, in discussing FIGURE 12, that such arrangement facilitates free-swinging disposition of the hydraulic cylinder 62 on the yoke trunnion pivot 61.

The details of the support provided for the hydraulic cylinder 62 are best shown by FIGURE 6. The plate 56 is formed to provide spaced yoke or trunnion arms 122 and 124 receptive of pivot pin fasteners 126 and 128 providing a pivotal axis for the hydraulic cylinder 62. The mounting bracket plate 56 is formed to dispose the power cylinder 62 for free-swinging motion outside the support panel wall 54.

The piston rod 64 is connected by a pivot pin 132 to the other end of the balance link 44 at pivot 66 in the lower angular part 68 and includes a nylon bushing 130. A shroud 134 is provided about the piston rod connection and welded to part 68 of balance link 44 to increase the efficiency of pivot 66.

FIGURE 7 shows the serrated and adjustable connection 72 provided within the balance link 44. As will be noted, particularly with reference back to FIGURE 4, the upper part 70 of balance link 44 is provided with an elongated opening 137 allowing for some relative adjustment with the serrations provided on the lower part 68 of balance link 44 before the bolt fastener 139 is tightened down. The serrated faying surfaces of the upper and lower parts of balance link 44 are held together tightly by fastener 139 and cause the balance link to act as a single rigid component.

A pivot pin 136 and bushing 138 provide the pivotal connection 74 (shown by FIGURE 2) between the pivotal link 44 and the mounting plate 56.

FIGURE 8 shows the support panel 54 secured to the body side wall 118 and disposing the mounting plate 56 in spaced relation apart from the body side wall. The rear side rail 28 of the top structure, which is normally of channel section, is shown flattened and pivotally secured by the pivot pin 141 to the mounting plate. This provides the pivotal connection 50 shown in FIGURES 1–4.

This cross-sectional view also shows the force transfer link 76 connected by a pivot pin 142 to the lower part 68 of the balance link 44 on the opposite side thereof relative to the upper part 70 of said balance link.

The disposition of the support panel 54 with respect to the vehicle body side wall 118 is shown in FIGURE 9. Herein the support panel 54 is shown as secured to the vehicle body side wall 118 and a flange of the wheel housing panel wall 144. The lower disposed and inwardly offset portion of the mounting plate 56 is shown as secured by the fasteners 58 to the support panel. This is the part of the mounting plate 56 which also serves as the trunnion support arm 122 shown in FIGURE 6.

FIGURE 10 is a cross-section taken through the transfer link 76 and showing the pivot pin connection 142 with the balance link 44 and a like pivot pin connection 148 with the flattened end of the rear side rail section 23.

The top plan view of the operating linkage shown by FIGURE 11 illustrates the channel section shape of the rear and center side rail sections 28 and 26. In this view the pivotal connection 42 between the two rail sections is best shown as is the pivotal connection 46 between the end of the center rail section 26 and the balance link 44. The upper part 70 of the balance link 44 is engaged to the lower part 68 which, in turn, has the piston rod 64 engaged thereto as at 66. The transfer link 76 is shown engaged between the lower part 68 of the balance link 44 and the flattened end of the side rail 28 via the pivotal pin connection 148. The rear cross bow 110 is shown as also pivotally connected at 111 to the rear frame side rail section 28.

The front end view, FIGURE 12, shows the manner of mounting the hydraulic cylinder 62 a little more clearly. The vehicle body side wall 118 and the support panel 54 are shown in phantom outline in this view to display the components related to this invention more clearly. The mounting plate 56 is seen to have the lower part 68 of the balance link 44 connected thereto as at 74. The flattened end of the rear side rail frame member 28 is shown connected to the support plate 56 as at 50. Although somewhat obscured, the transfer link 76 is also shown as connected by the pivotal fastener 148 to the flattened end of the rear side rail frame section 28.

FIGURE 13 shows a part of the operational linkage 78 in an enlarged scale and progressive dispositions. In this particular instance the cam slot connection 102 is shown with a cam slot 152 in the primary rocker link 96 and a cam slot pin 150 provided on the thrust link 80. The cam action connection may also be provided elsewhere, as will be appreciated in discussing FIGURES 15 and 16 later.

The progressive views of the rocker arm and related operating linkage shown by FIGURES 13 and 15 has the clearance for movement of the actuator pin within the cam slot exaggerated to better illustrate travel of the actuator pin over the cam surfaces of the slot. Actually, tolerances are held as close as practical.

FIGURE 13 shows the center or intermediate side rail section 26 with the thrust link 80 disposed relatively thereover and within the channel side walls thereof. The thrust link 80 has its after end operatively connected to the forward end of the rear frame rail section 28 and its forward end connected to the thrust link extension 84 (neither of which are specifically shown in FIGURE 13 but are shown in FIGURE 14).

The thrust link extension 84 (shown in FIGURE 14) has the pivot pin 150 fixed to the after end thereof and extended through the cam slot 152 formed to be crescent-shaped and provided in the primary rocker link 96 to form the cam slot connection 102 previously referred to and so identified in the other drawing figures. The pivot pin 150 also provides a pivotal connection between the thrust link 80 and its extension part 84 by engagement with the former.

In the succeeding discussion describing the operative mechanism 78, with particular reference to the effect of the cam slot connection 102, attention should be given FIGURES 1–3 and 13.

When the folding top 12 is fully retracted, the initial thrust force received through the lower actuating or operative linkage, including the rear frame rail section 28 and balance link 44, is transmitted to the thrust link 80 and applied directly to the thrust link extension 84. This is due to the shape and orientation of the cam slot 152 in the primary rocker link 96 which follows the pivot or cam slot pin 150 to travel a short distance in the slot without cam action engagement with the cam faces thereof. Accordingly, the initial thrust is transmitted to the pivot plate 34 and acts to rotate the plate about its pivotal connection 38 with the intermediate frame rail section 26. This, in turn, causes a forward tensioning of the forward side frame rail section 24 due to its pivotal connection 36 with the pivot plate 34.

The tendency of the forward frame rail section 24 to move forward, at the very outset of the actuing movement, is transmitted to the control link 92 through its pivotal connection 94 therewith and in turn through the secondary rocker link 86 back to the thrust link 80. The reactionary effect is to cause the forward end of the forward frame rail section 24, which is disposed rearwardly, to be initially tensioned for lift out of the storage well and to carry with it the links 92 and 86.

This is of particular significance in avoiding undue pressure being applied by the operative links on the top fabric 104 which is folded therebetween. As will be appreciated, having these pressures first to be relieved and last to be applied (as is the case in retracting the top into storage) precludes any pinching and abrasion of the cover material in the operation of the linkage which might otherwise cause premature wear.

With such a tension applied in the system, it will be apparent that the pivot or actuator pin 150 progresses further from the locking end 154 of the cam slot until it engages the concave side thereof (reference FIGURE 13). Thereupon it commences to actuate the rocker link 96 radially about its pivotal connection 98 with the center frame rail section 26. In turn, radial movement is imparted to the secondary rocker link 86 about its pivotal connection 88 on the thrust link 80; which moves forward with the thrust link.

The immediate effect, due to having the forward frame rail 24 pre-tensioned for lift as previously described, is to raise the upper disposed forward frame rail 24 out of storage and to swing it about its pivotal connection 36 on the hinge plate 34 and relative to the center rail section 26 to which the hinge plate is also engaged.

When the primary rocker link 96 has positioned the secondary rocker link 86 substantially vertical, the actuator pin 150 crosses over to the convex side of the slot 152 (figuratively speaking) before reaching the far end of the slot and follows the convex surface back to the locking end thereof as the top structure passes over center and gravitational forces come into play. When the top is disposed vertically the power demands on the system are minimal and the cross-over movement of the pin does not effect any loss in control. Further, this is more technical than factual.

The actuator pin 150 reaches the locking end 154 of the cam slot 152 just prior to the seating of the top structure on the windshield header bar 16 and in the final movement of the thrust link 80 affecting the upper operative linkage 78.

With close reference to FIGURE 13 it will be noted that the distance between the pivotal connection 98 of the rocker link 96 to the center frame rail 24 and the pivot pin actuator 150 is greatest at the extreme positions of the operative mechanism; namely, when the top is either fully erected or retracted. Thus the forceful biasing of the actuator pin 150 at the end of the cam slot 152 introduces a rigidizing in the system to hold all of the components in rattle-free biased engagement when the top is either fully erected or retracted. For example: when the top is erected the locking force in the rocker link 96 holds the front rail 24 in tension through and with the secondary rocker 86 and control link 92, the pivot plate 34 is affected through and with the thrust link extension 84, and the rear frame rail 24, intermediate rail 26 and balance link are affected by the thrust link 80 being connected to the rear frame rail. The same situation prevails when the top is fully retracted.

The cam slot connection 202 shown by FIGURES 15 and 16 is somewhat different though essentially the same result is obtained.

In the arrangement of these drawing figures the actuator or pivot pin 250 is provided on the end of the primary rocker link 96 and is engaged with the secondary rocker link 86 within a cam slot 252 provided therein. The cam slot is provided between the ends of the link 86 and is essentially straight.

The primary rocker link 96 is engaged to the center side rail section 26 by a pivotal connection 98, as before, and with the thrust link 80 by a fixed pivotal connection 200.

Initial top actuating forces are received through the thrust link 80 and its extension 84 to initiate rotary movement of the forward side rail 24 about the hinge plate 34 connection to the center rail 26. At the same time the primary rocker link 96, through the actuator pin 250, lifts the secondary rocker 86 as the front rail carries the control link 92 so that an actuating force is also at work through the pivotal connection 90 between the control and secondary rocker links.

As before, the actuator pin 250 travels from the end 254 of the slot 252 and along one cam surface to an intermediate position short of the other end of the slot where it figuratively crosses over and then returns along the other cam surface to the end of the slot from whence it started.

The same rattle-free locking is obtained.

Other aspects of the casual relation between the movement of the components mentioned in FIGURES 13–16, and others in the operative mechanism, will be better understood and more fully appreciated in the description of the operational sequence incident to raising and lowering the complete top structure and which follows later.

It will be appreciated that other convertible top actuating mechanisms may be adapted for use with the top operating linkage disclosed.

A vane type hydraulic actuator 262 is shown by FIGURE 17 as adapted for such use in place of the hydraulic cylinder 62.

In the discussion of this type actuator, and others hereafter, previously described parts of the top operating mechanism are identified by like reference numerals where appropriate and proper and by like reference numerals with a distinctive prefix where similarity of structure or purpose exists but some distinction is required to be made. This is to afford a continuity of discussion without unnecessary repetition of descriptive details.

The actuator 262 is secured to a mounting plate 256 which is in turn secured to the actuator supporting weldment 54 on the inner side wall of the vehicle body. The balance link 44 has its angular part 68 pivotally connected to the mounting plate as before and the rear frame rail section 28 is pivotally engaged thereto, as at 50.

The vane type hydraulic actuator 262 includes a fluid chamber forming housing 270 bolted to the mounting plate 256. In the present instance the housing is shown as sectorial in shape with a fluid chamber 272 of like shape provided therein. Hydraulic fluid supply and exhaust lines 274 and 276 are connected to the housing and are in communication with opposite ends of the fluid chamber. A rotary vane member 278 is provided in the fluid chamber and is motivated by the pressure build up on one side or the other thereof. A connecting link 264, operative in unison with the vane member 274, is disposed externally of the housing 266 and is suitably connected to the balance link 44, as at 266, for actuation of the convertible top operating linkage previously described.

FIGURES 18–20 show a trunnion mounted form of jack screw actuator 362 for operation of the convertible top linkage.

In this instance, a small gear housing member 370 is supported in the trunnion mounting 60 provided on the mounting plate 56. It includes a chamber space 372 within which is mounted an internally threaded bevel gear member 374 suitably journaled for rotation. A threaded connecting rod 364 extends therethrough and serves as the jack screw. The connecting rod screw 364 is engaged to the balance link 44 in the manner previously described for the cylinder actuator 62 and operates the top mechanism as the threaded rod is fed and retracted through the travel nut housing 370.

A flexible cable connection 376 to the housing 370, and more specifically to a worm gear 378 mounted in the housing and engaged with the bevel gear 374, is adapted to drive the connecting rod screw and operate the top mechanism.

FIGURES 21–22 show a flexible gear type of rotary drive device 462 for convertible top operation.

The rotary drive device shown is of the harmonic drive type including a flexible ring gear member for high-torque output and high-speed reductions. It includes a gear housing 470 bolted to the support plate 56. A fixed ring gear 472, with internally disposed teeth, is provided in the housing and has a flexible ring gear 474, with external teeth, disposed for mating engagement therewith.

Both ring gears have the same circular pitch but the flexible inner gear 474 has fewer teeth and its pitch circle is smaller.

A planetary roller arrangement 476 disposed within the flexible gear causes distortion of the flexible gear and meshing engagement with the external gear at the planetary rollers 478. As the planetary rollers progress about the sun roller 480 the flexible gear will rotate or roll backwards (in an opposite direction) on the fixed ring gear. The engaged teeth are stationary and serve as splines in full contact while movement of the flexible drive member is confined to that area where the teeth are disengaged. Each rotation of the planetary drive moves the flexible gear a distance equal to only the tooth differential between the two ring gears.

Drive is imparted to the sun roller 480 through a bevel gear 482 operatively connected thereto and driven by a worm gear 484 through a flexible cable connection 486 to a drive power source 488. The flexible gear 474 has an operator arm 464 connected thereto and which is in turn connected to the balance link 44 of the top operating linkage. The arm 464 is shown as connected to the balance link at the point at which the transfer link 76 is engaged thereto.

It will be appreciated that the different drive mechanisms or operators 62, 262, 362 and 462 each have certain advantages one over the other but that each is itself capable of operating the folding top structure in the manner previously described. For example, it should be appreciated that each of the operators apply power through the balance link 44, but that the vane type actuator 262 and rotary actuator 462 do so about the lower pivotal connection of the balance link 44 to the support plate 54.

Operation

The operational aspects of this invention will be best understood and appreciated by a discussion of the preferred embodiment thereof as shown by FIGURES 1–14. Accordingly discussion hereafter will be limited thereto except as certain exceptions in the modifications previously described and shown in the drawings are considered worth special mention beyond what has already been said.

In raising the top structure 12, the power cylinder 62 is activated and a lifting force is applied to the balance or operating link 44. This lifting force is also applied to the rear side rail section 28 through the transfer link 76.

The balance link 44 and the rear side rail section 28 form a trapezium with the interconnecting parts of the center side rail section 26 and the mounting bracket 52. In turn, a second and internal trapezium is formed by the transfer link 76 which is connected intermediate the ends of the balance link and rear side rail section members.

The transfer link 76 thus affords lifting assistance in the raising of the rear side rail section 28, and in turn the rest of the top structure, and also, serves to cordinate and control the top raising movement.

Figure 3:
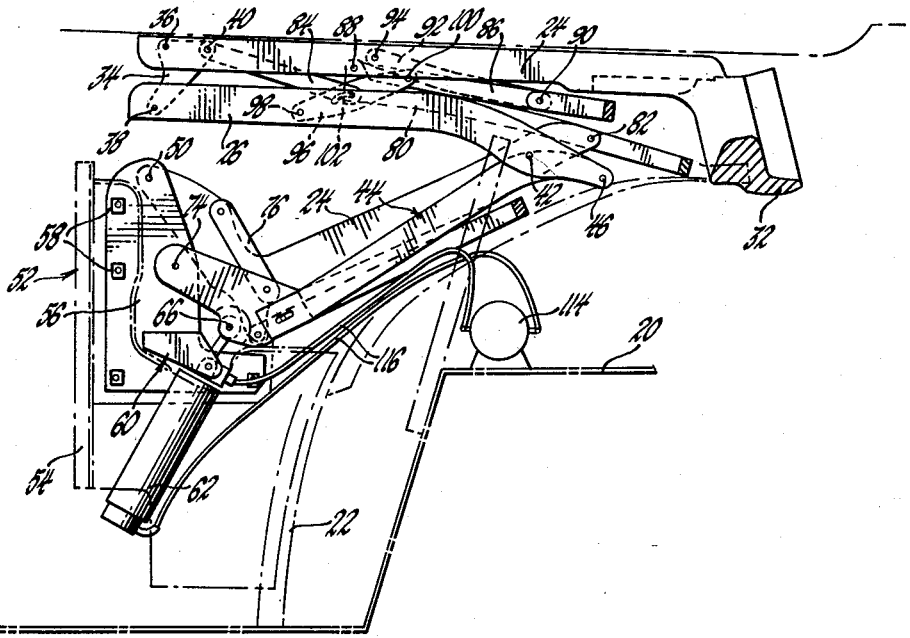
FIGURE 3 is a similar view of the convertible top showing the same in a folded position.

The transfer link 76, as disposed to form the internal trapezium, provides an internal separating force between the balance link 44 and the rear side rail section 28 at their end positions and thereby effects a more responsive condition upon actuation by the power cylinder 62 both in raising the top from the housed position shown by FIGURE 1 and the erected position of FIGURE 3. Aside from providing a more responsive operative mechanism, one is obtained which is essentially rattle-free due to the internal forces maintained and in having the rear rail and balance link activated simultaneously about their respective lower pivots.

To continue with the operational description:

As the rear side rail section 28 swings upward and forward, the center rail section 26 is likewise carried forward. At the same time it is retained in a substantially horizontal position by the restraint imposed by the balance link 44.

The forward swinging stroke of the rear side rail section 28 carries the power or thrust link 80 forward and provides a thrust force through its extension 84 to the pivot plate 34 and therethrough to the forward side frame rail section 24.

The power or thrust link 80 and its extension 84 serve as essentially a single thrust member and as part of a trapezium linkage with the center side frame rail section 26 and the pivot plate and rear side rail section parts engaged therebetween.

Figure 2:
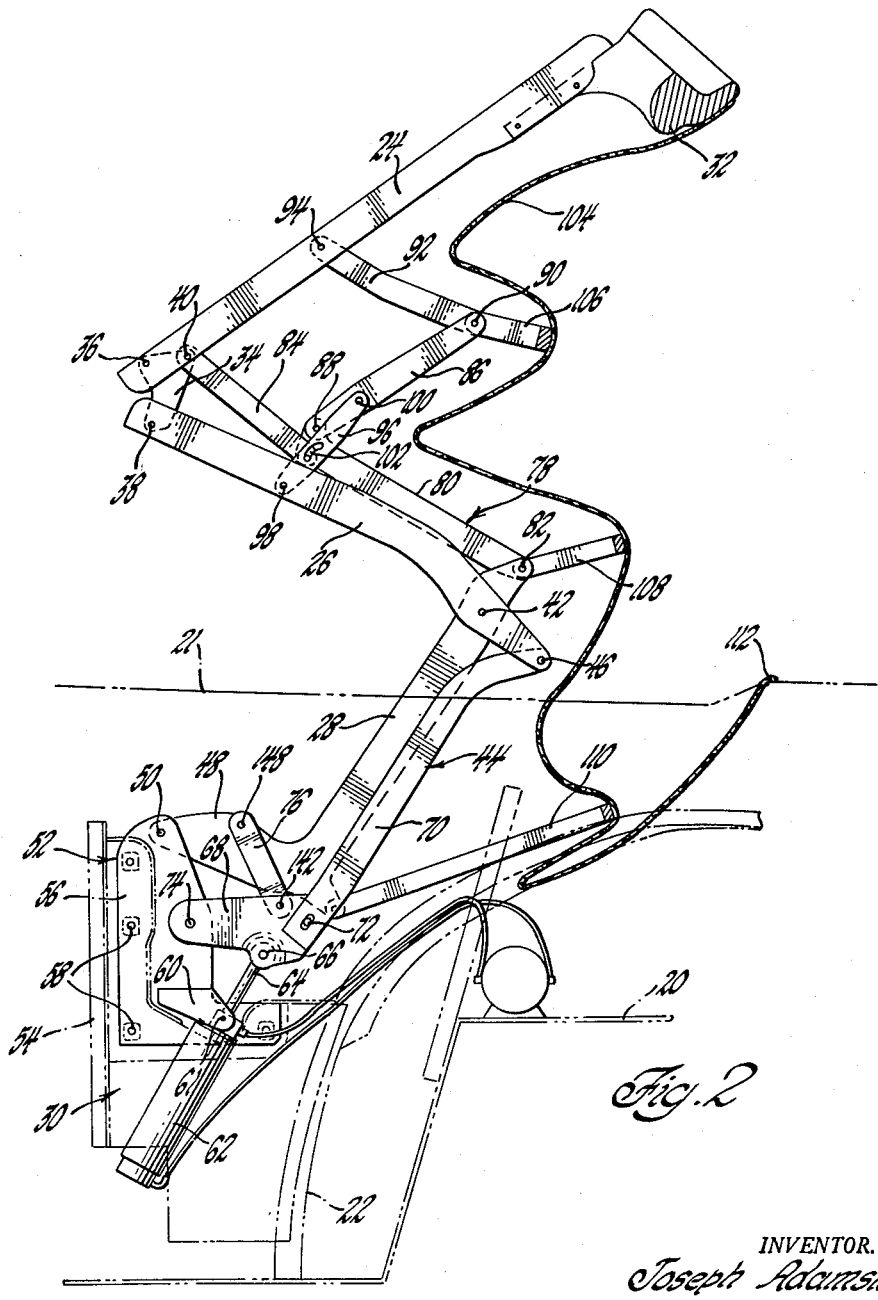
FIGURE 2 is a similar view of the convertible top shown by FIGURE 1 with the top shown in an intermediate operative position.

As the center frame rail trapezium is opened and closed, in erecting the top structure, the pivot plate member 34 swings about the pivotal axis 38 to carry the forward side frame rail section 24 in a forward direction. Simultaneously, the power or thrust link 80 motivates the primary rocker link 96, through the cam slot connection 102, to swing the secondary rocker link 86 and initiate movement of the front rail control link 92. This swings the front rail section 24 about the pivotal axis 36 and from a rearwardly to a forwardly disposed position; as shown in the sequence of FIGURES 3, 2 and 1.

The initial movement of the power or thrust link 80 advances the actuator pin 150 in a straight line within the crescent-shaped cam slot 152 from the locking end 154 and for a relatively short distance. This is sufficient for the power link 80 to initiate pivotal movement of the pivot plate 34 about the pivotal axis 38 and to carry the pivotal connection 36 with the front side rail frame section 24 to an over-center position (relative to the pivotal axis 38) so that the initial movement of the rearwardly disposed forward end of the front side rail frame section and pivot 90, as shown in FIG. 9, is such as to prevent the closing of the space between the side rail and pivot 90 which would otherwise cause pinching of the fabric top material innerlaid between the folding frame rails, the operative linkage and the cross-bow members. If the primary rocker link 96 were activated at the outset, the space between the rearwardly disposed forward end of the front frame rail section 24 and pivot 90, as shown in FIG. 3, would close at the beginning of the forward swinging motion, in the absence of other compensation for such eventuality.

The actuator pin 150 travels along the concave side of the cam groove slot 152, as the thrust or power link 80 is advanced, to swing the primary rocker link 96 about its pivot 98 from a rearward to a substantially vertically disposed position. When the rocker link 96 is vertically disposed the forward frame rail section 24 is also disposed vertically and the weight of the forward section of the top is shifted from one side to the other across the rocker link 96. This causes the actuator pin 150 to figuratively shift to the convex side of the cam groove slot 152.

During the subsequent operation of the vehicle top operating mechanism, gravitational forces are at work and assist in erecting the top structure.

The actuator pin 150 rides over the convex surface of the cam groove slot 152 back towards the locking end 154 while the thrust link 80, through its extension 84, continues the rotational movement of the pivot plate 34 to align the adjacent ends of the front and center frame rail sections. The primary rocker link 96, via the cam slot connection 102, carries the secondary rocker link 86 and the front rail control link 92 forward to dispose and hold the front frame rail section 24 aligned with the center frame rail section 26.

It will be noted that the front rail section operating and control links 86 and 92 are positioned close to alignment when the top is erected; reference FIGURE 1. However, they are not aligned nor carried over center for toggle-link type locking. The top structure is nevertheless locked in its erected position by the forward thrust position of the power link 80 and its restraint through the actuator pin 150 as regards any movement of the rocker arm 96 which would enable the operating and control links to break. Furthermore, the cam slot groove 152 is foreshortened sufficiently to obtain a locking bias of the actuator pin 150 at the locking end 154 of the cam groove slot. This has the further advantage of holding all of the pivotal connections in compression when the top is erected and makes them accordingly more receptively disposed for the subsequent operation of collapsing the top structure.

Quite similarly, when the top structure is collapsed, the thrust link 80 is in its furthest retracted position and again holds the actuator pin 150 biased in the locking end 154 of the cam groove slot. Thus the disclosed structure is effectively locked and held in a biased rattle-free condition at both extreme operational conditions of the top structure.

It is assumed that it is readily understood that the collapsing of the top structure from its erected position is obtained by an essentially reverse procedure to that mentioned in describing how the top is erected. Accordingly, no detailed description in this regard is considered necessary.

It is also assumed that it is apparent that the cross-bows 106, 108 and 110 are raised and positioned as the fabric covering material 104 is drawn tight. Similarly, as the top structure is folded back, the cover material 104 folds between the adjacently disposed cross-bows, rear deck and top header member connections.

It will be noted that the top operating linkage 78 nests substantially within the center and front frame rail sections when the top is both erected and collapsed. Further, the cross-bow members are disposed near the ends of respective frame rail sections and such that they do not interfere in any way with the operating linkage but are disposed in a most unobstructive manner when the top structure is collapsed, this being conducive to desired folding of the fabric for storage.

Of further note and worth repeating is the fact that the trunnion supported power cylinder 62, being mounted on the mounting bracket assembly 52 with the rest of the operational linkage, provides a self-contained sub-assembly. This enables the top structure to be pre-assembled, adjusted and tested for operational efficiency, and to be subsequently mounted on a vehicle body with only minor adjustment and such as can be readily accomplished between the disclosed body weldment 54 and support plate 56.

It will be appreciated that the arrangement of the components of the operational linkage 78 over and within the intermediate side rail sections 26 of the top structure enable a much more attractive and slimmer roof line to be obtained on convertible type vehicles. The elimination from view of the operative members of such linkage and of the actuating linkage, by obtaining a lower disposition for the actuator under the balance link, also adds to the aesthetic appearance of the structure both within and outside the vehicle on which provided.

The marked improvement in the operational efficiency of the operative linkage 78 in controlling the forward and intermediate side rail sections, along with the improvements obtained in the use of the force transfer link 76 to provide internal tensioning of the rear side rail section and of the balance link, appreciably reduces the work output required of the folding top actuators and permits the use of such smaller and more compact power producing means. This, in turn, enables the actuator to be mounted with and under the balance link, rather than to the rear side rail, where a smaller unit may be more effective. At the same time, the smaller size of the actuator enables having it mounted within the body weldment without interference therewith or extensive rearrangement thereof.

Although certain specific embodiments of this invention have been shown and described in detail, it will be appreciated that other innovations, modifications and variations are within the scope of the teachings set forth. Accordingly, such of these innovations, modifications and variations as are within the spirit of the invention as herein set forth, are not specifically excluded by the language of the hereinafter appended claims, are to be considered as inclusive thereunder.

I claim:
1. A folding top mechanism for vehicles, comprising: a pair of relatively spaced articulated side rails each including front, center and rear rail sections, a pivot plate connecting the adjacent ends of said front and center rail sections together and providing for relative pivotal movement therebetween, means pivotally connecting said center and rear rail sections together intermediate their respective ends, an articulated control linkage pivotally connecting the forward end of said rear rail section to said center and front rail sections for actuating control of said center and front rail sections, a balance link pivotally connected to the rear end of said center rail section, means pivotally engaging the rear ends of said rear rail section and balance link to a vehicle body, power operating means mounted in said vehicle body and operatively engaged to said balance link, and a power transfer link pivotally connected between said rear rail section and said balance link intermediate the ends thereof for coordinated operation of said rear rail section and balance link together whereby each of the rear rail sections and its associated balance link are effective to transmit force to other members of the vehicle top.

2. The folding top mechanism of claim 1, having said power transfer link provided near the lower ends of said rear rail section and said balance link and in co-extensive trapezium forming relation therewith.

3. The folding top mechanism of claim 1, having said rear rail and balance link co-extensive and providing a trapezium with the interconnecting center rail and vehicle body parts between the pivotal connections of said rear rail and balance link thereto, and said transfer link being interposed in a trapezium forming and restrictive relation therewithin.

4. A folding top structure for vehicles, as defined in claim 1 including a thrust link operatively connected between said rear and front rail sections and disposed in co-extensive and trapezium forming relation to said center rail section, an operative linkage connected between said front rail section and said thrust link intermediate the ends thereof, a rocker arm link having one end pivotally connected to said center rail section, said rocker arm link having the other end thereof engaged to said operative linkage and to said thrust link intermediate its ends for actuation of said thrust link and the side rail sections operatively connected thereto.

5. The folding top structure of claim 4 including an axially disposed crescent shaped cam slot provided in said rocker arm between the ends thereof and a follower provided on said thrust link and engaged within said slot.

6. The folding top structure of claim 5: said thrust link follower being disposed to over-travel the defining limit of said slot for locking bias within the end thereof and the biasing of contiguous inter-related pivotal connections.

7. A folding top mechanism for vehicles, comprising: articulated side rails including front, center and rear rail sections, means pivotally connecting the adjacent ends of said front and center rail sections together and said center and rear rail sections together intermediate their respective ends, an articulated control linkage provided between the forward end of said rear rail section and said center and front rail sections for actuation of said center and front rail sections upon operation of said rear rail section, a balance link pivotally connected to the rear end of said center rail section, means adjustable on a vehicle body and having the rear end of said rear rail section and of said balance link pivotally engaged thereto, power operating means mounted wholly on said adjustable means last mentioned and operatively connected to one of said rear rail section and balance link, and a power transfer link pivotally interconnecting said rear rail section and said balance link to provide coordinated operation of the rear rail section and the balance link in the course of power operation of one thereof.

8. The folding top mechanism of claim 7: said adjustable means including a trunnion support and said power operating means including a hydraulic cylinder having the operational end thereof pivotally engaged within said support for free-swinging movement of said cylinder in the actuation of said side rail sections.

9. In a convertible top operating mechanism for automotive vehicles including a front rail, and a center rail articulately interconnected, a rear rail, means pivotally connecting said rear rail to said center rail, means pivotally connecting the lower end of said rear rail to a vehicle body, a balance rail, means pivotally connecting one end of the balance rail to said center rail, means pivotally connecting the other end of the balance rail to the vehicle body for pivotal movement about an axis spaced from the pivotal axis between the rear rail and vehicle body, a power transmitting link means pivotally interconnecting the rear rail and the balance rail adjacent the pivotal connections between said balance and rear rails and the vehicle body, an actuator for said rear rail and the said balance rail, means mounting said actuator to the vehicle body and means including said power transmitting link means for transmitting motion from said actuator to said rear rail and said balance rail whereby the rear rail and the balance rail are each effective to transmit force to other members of the convertible top.

10. In a convertible top operating mechanism for automotive vehicles including a front rail, and a center rail articulately interconnected, a rear rail, means pivotally connecting the rear rail to said center rail, means pivotally connecting said rear rail to a vehicle mounted bracket, a balance rail, means pivotally connecting one end of the balance rail to said center rail, means pivotally connecting the other end of the balance rail to the bracket for pivotal movement about an axis spaced from the pivotal axis between the rear rail and bracket, a power transmitting link means pivotally interconnecting the rear rail and the balance rail adjacent the pivotal connections between said balance and rear rails and the bracket, an actuator for said rear rail and said balance rail, means pivotally mounting said actuator to said bracket on an axis spaced from the axes of the pivotal connections between the bracket and the rear rail and the balance rail, and means for transmitting motion from said actuator to said rear rail and said balance rail whereby the rear rail and the balance rail are each effective to transmit force to other members of the convertible top.

11. In a convertible top operating mechanism for automotive vehicles including a front rail, and a center rail articulately interconnected, a rear rail, means pivotally connecting said rear rail to said center rail, means pivotally connecting the lower end of said rear rail to a vehicle body, a balance rail assembly comprising an upper and a lower section adjustably and rigidly connected together, means pivotally connecting the upper section of the balance rail assembly to said center rail, means pivotally connecting the lower section of the balance rail assembly to the vehicle body for pivotal movement about an axis spaced from the pivotal axis between the rear rail and vehicle body, a power transmitting link means pivotally interconnecting the rear rail and the balance rail assembly adjacent the pivotal connections between said balance rail assembly and the rear rail and the vehicle body, an actuator for folding and unfolding the convertible top, means mounting said actuator to the vehicle body and means for transmitting motion from said actuator to said balance rail assembly whereby the rear rail and the balance rail assembly are each effective to transmit force to other members of the convertible top.

References Cited by the Examiner
UNITED STATES PATENTS

| 1,952,252 | 3/34 | Heuser | 296—107 |
| 3,007,315 | 11/61 | Marshall | 254—93 |
| 3,036,859 | 5/62 | Adamski | 296—116 |

A. HARRY LEVY, *Primary Examiner.*

PHILIP ARNOLD, *Examiner.*